(12) United States Patent
Tsai

(10) Patent No.: US 7,362,373 B2
(45) Date of Patent: Apr. 22, 2008

(54) PORTABLE ELECTRONIC DEVICE WITH PROTECTED BUILT-IN CAMERA

(75) Inventor: Ming-Chiang Tsai, Tu-Chen (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 786 days.

(21) Appl. No.: 10/832,645

(22) Filed: Apr. 26, 2004

(65) Prior Publication Data

US 2004/0212728 A1 Oct. 28, 2004

(30) Foreign Application Priority Data

Apr. 25, 2003 (TW) .............................. 92206592 U

(51) Int. Cl.
  *H04N 5/225* (2006.01)
  *H04M 1/00* (2006.01)
(52) U.S. Cl. .................................... 348/376; 455/575.3
(58) Field of Classification Search ........... 379/433.13; 455/575.1, 575.3; 348/374, 376
See application file for complete search history.

(56) References Cited

U.S. PATENT DOCUMENTS

| 6,069,648 | A | 5/2000 | Suso et al. |
| 6,308,084 | B1 | 10/2001 | Ionka |
| 6,879,337 | B2 * | 4/2005 | Tatehana et al. ......... 455/575.1 |
| 7,286,181 | B2 * | 10/2007 | Cha ........................... 348/374 |
| 2003/0125080 | A1 * | 7/2003 | Shimamura ................. 348/376 |
| 2003/0174240 | A1 * | 9/2003 | Wada et al. ............. 455/575.1 |
| 2004/0012701 | A1 * | 1/2004 | Nagai et al. ........... 348/333.12 |
| 2004/0107537 | A1 * | 6/2004 | Ahn et al. .................... 16/221 |
| 2004/0203535 | A1 * | 10/2004 | Kim et al. ................ 455/90.3 |
| 2005/0049019 | A1 * | 3/2005 | Lee ......................... 455/575.4 |

FOREIGN PATENT DOCUMENTS

| CN | 01144305.7 | 7/2002 |
| CN | 02122769.1 | 1/2003 |

* cited by examiner

*Primary Examiner*—Tuan Ho
*Assistant Examiner*—Jason Whipkey
(74) *Attorney, Agent, or Firm*—Wei Te Chung

(57) ABSTRACT

A portable electronic device with a camera includes: a main body (14); a cover body (12); a driver gear (162) fixed relative to the cover body and having a plurality of teeth (1622); a driven gear (164) having a plurality of teeth and meshing with teeth of the driver gear; a lens (1642) installed in the driven gear; and a hinge mechanism pivotally connecting the main body with the cover body. When the cover body is rotated to an open position, the driver gear rotates with the cover body, thereby driving the driven gear to rotate. The lens in the driven gear is thereby exposed to the external environment for taking photos. When the cover body is rotated back to a closed position, the lens is thereby rotated back into the main body where it is protected from the external environment.

20 Claims, 5 Drawing Sheets

PORTABLE ELECTRONIC DEVICE WITH PROTECTED BUILT-IN CAMERA

FIELD OF THE INVENTION

The present invention relates to portable electronic devices such as mobile phones and personal digital assistants (PDAs), and particularly to portable electronic devices with built-in cameras.

BACKGROUND OF THE INVENTION

Nowadays, portable electronic devices, such as mobile phones and PDAs, are being developed to provide a wide variety of functions. There is a considerable consumer demand for portable electronic devices with built-in or plug-in cameras. A plug-in camera is separate from the portable electronic device when it is not in use, and plugged into the portable electronic device for use. It is inconvenient to carry the plug-in camera around as a separate unit, and to plug and unplug the plug-in camera. In addition, if the plug-in camera is relatively small, it is easily misplaced or lost once it is detached from the portable electronic device. Compare this with the built-in camera, which is integrated into the portable electronic device. The portable electronic device with the built-in camera has excellent portability and practicality. At present, most portable electronic devices with cameras in the marketplace are the built-in camera type.

In most present-day portable electronic devices with built-in camera, the lens of the camera is exposed at an outer surface of a cover body of the portable electronic device. Generally, only a transparent glass sheet is provided on the lens to protect it. An example is the folding mobile phone model No. P504IS marketed by Panasonic Mobile Communications Co., Ltd. In general, the mobile phone is held in the user's hand when operated, and put inside a cover or case when not in use. The transparent glass sheet is susceptible to becoming soiled and scratched over time, which reduces the quality of photographs taken.

To overcome the foregoing problem, a folding mobile phone with a camera is provided in China published patent application number 02122769. In this mobile phone, a lens of the camera is installed in a cavity of a rotary shaft. The rotary shaft joins a cover body and a main body of the main mobile phone together. The user can turn the rotary shaft to change the location of the lens relative to the main body. When the user wants to take a photo, he/she first opens the cover body, and then turns the rotary shaft to make the lens face away from the outer surface of the main body. Once the user has taken the photo, he/she first turns the rotary shaft to make the lens face toward the inner surface of the main body, and then closes the cover body. The lens is thus protected from environmental harm such as dust and scratching. However, the mobile phone is inconvenient to operate, because the rotary shaft must be rotated by hand. In addition, the user may forget to turn the rotary shaft to make the lens face toward the inner surface of the main body before closing the cover body.

Therefore, an improved portable electronic device with a camera which overcomes the above-described disadvantages is desired.

SUMMARY OF THE INVENTION

An object of the present invention is to provide a portable electronic device with a camera which can conveniently give protection to a lens thereof when the portable electronic device is not in use.

To achieve the above object, the present invention provides a portable electronic device with a camera comprising: a main body; a cover body; a driver gear fixed relative to the cover body and having a plurality of teeth; a driven gear having a plurality of teeth and meshing with teeth of the driver gear; a lens installed in the driven gear; and a hinge mechanism pivotally connecting the main body with the cover body. When the cover body is rotated between a closed position and an open position, the driver gear rotates with the cover body relative to the main body, thereby driving the driven gear to rotate. The lens in the driven gear is thereby exposed to the external environment at an outer surface of the main body for taking photos. When the cover body is rotated between the open position and the closed position, the lens is thereby rotated back into the main body where it is protected from the external environment.

Other objects, advantages and novel features of the invention will become more apparent from the following detailed description of an exemplary embodiment thereof when taken in conjunction with the accompanying drawings, wherein:

DETAILED DESCRIPTION OF THE INVENTION

A portable electronic device in accordance with the present invention pertains to a folding mobile phone, a personal digital assistant (PDA), and like apparatuses. The present invention will be described as being embodied in a folding mobile phone as an illustrative example, with reference to the drawings as follows.

Figure 1:
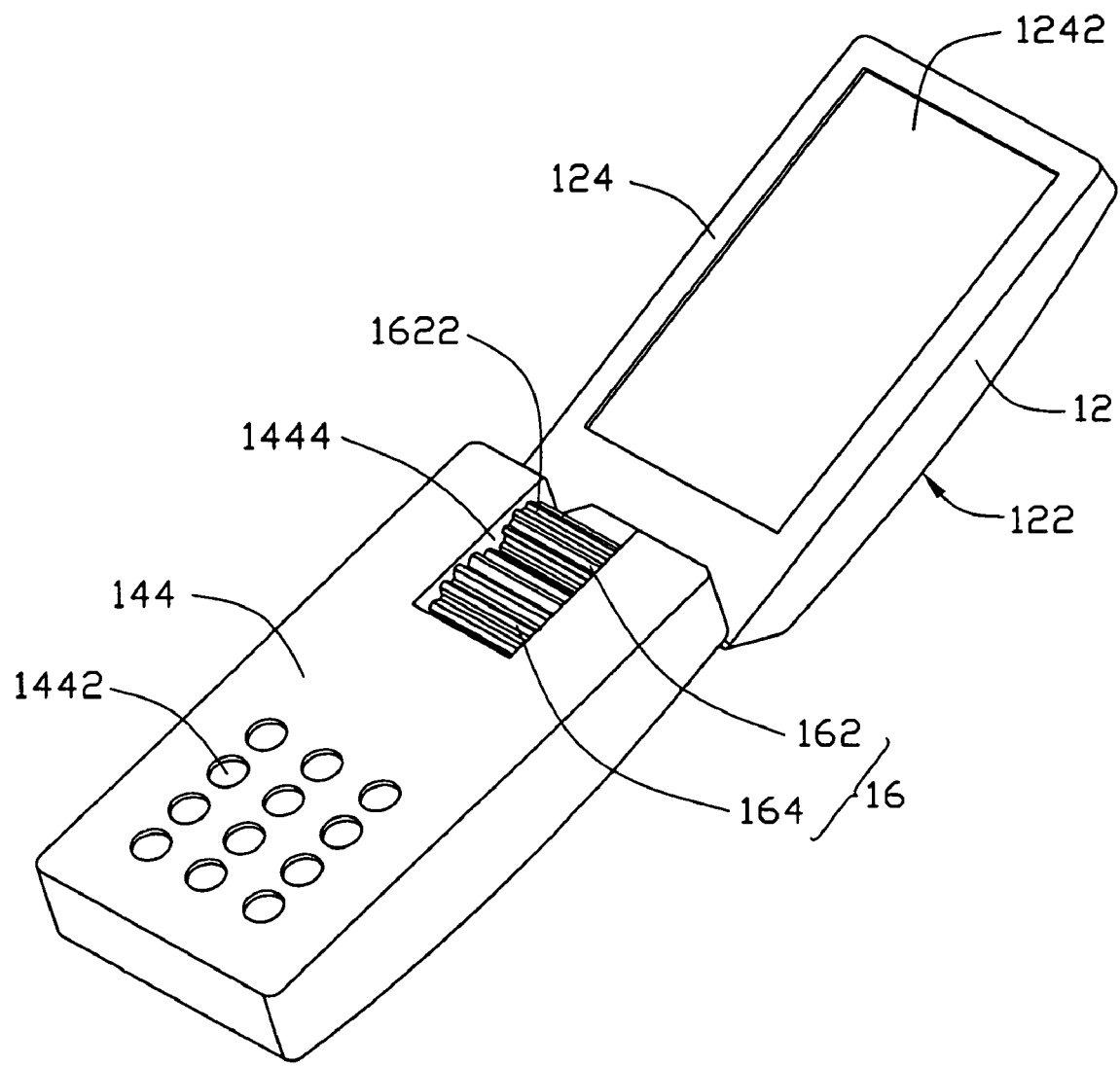
FIG. 1 is an isometric view of a folding mobile phone with a camera in accordance with an exemplary embodiment of the present invention, showing the mobile phone in an open position.

Referring now to the drawings in detail, FIG. 1 shows the exemplary mobile phone, which comprises a cover body 12, a main body 14, and a lens module 16. The cover body 12 and the main body 14 are pivotably joined together by a hinge mechanism (not shown), for movement between a closed position and an open position. The lens module 16 is disposed where the cover body 12 and the main body 14 are joined together.

Figure 3:
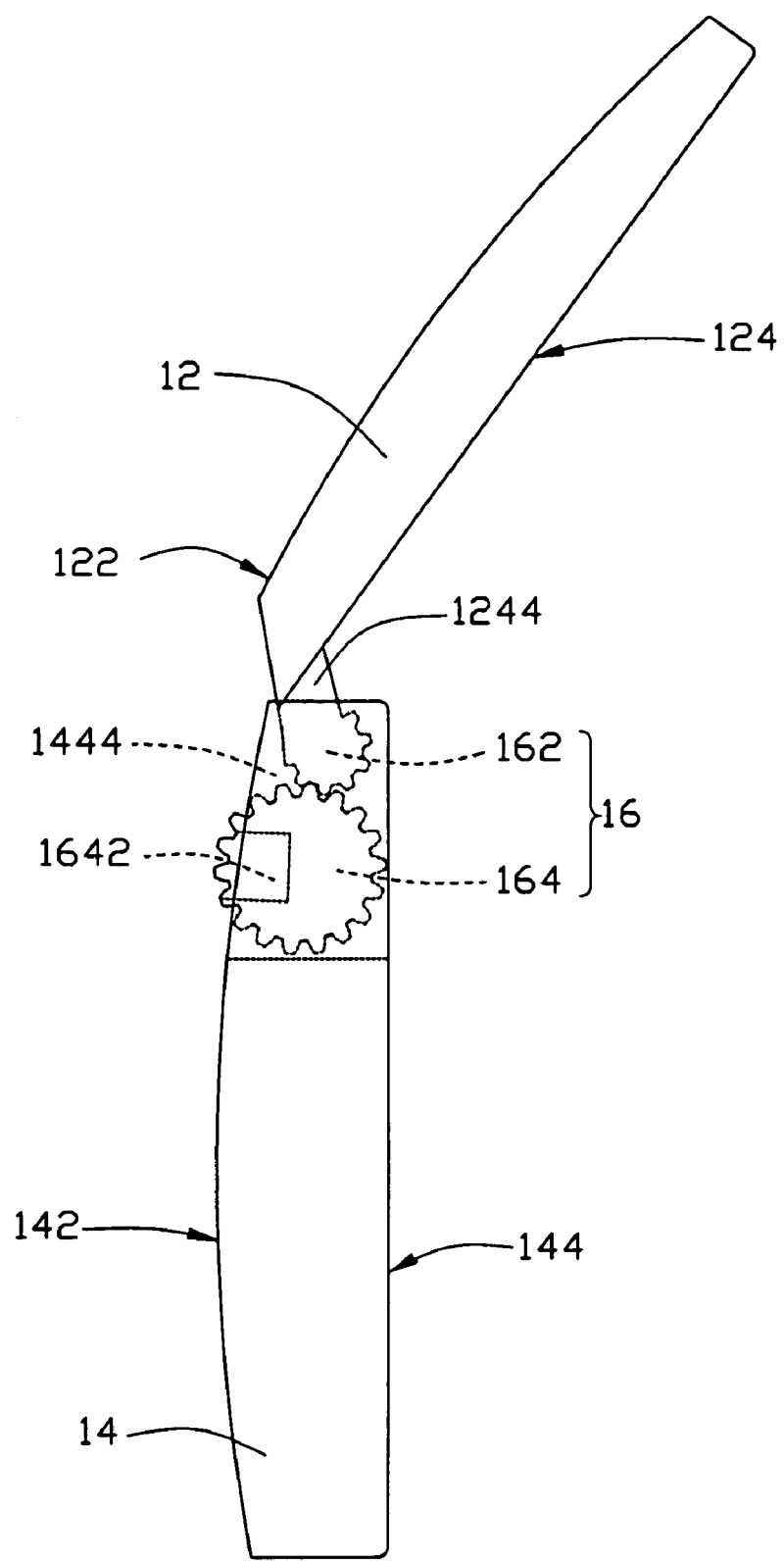
FIG. 3 is a side elevation of the mobile phone of FIG. 1 in a partly open position, showing in broken lines gears and a lens in a main body thereof.

Referring also to FIG. 3, the cover body 12 has an outer surface 122 and an inner surface 124. An LCD (Liquid Crystal Display) 1242 is provided in the inner surface 124, for displaying short messages and previewing photos taken using the lens module 16. A joint portion 1244 extends from a proximal end of the cover body 12 adjacent to the main body 14.

Figure 2:
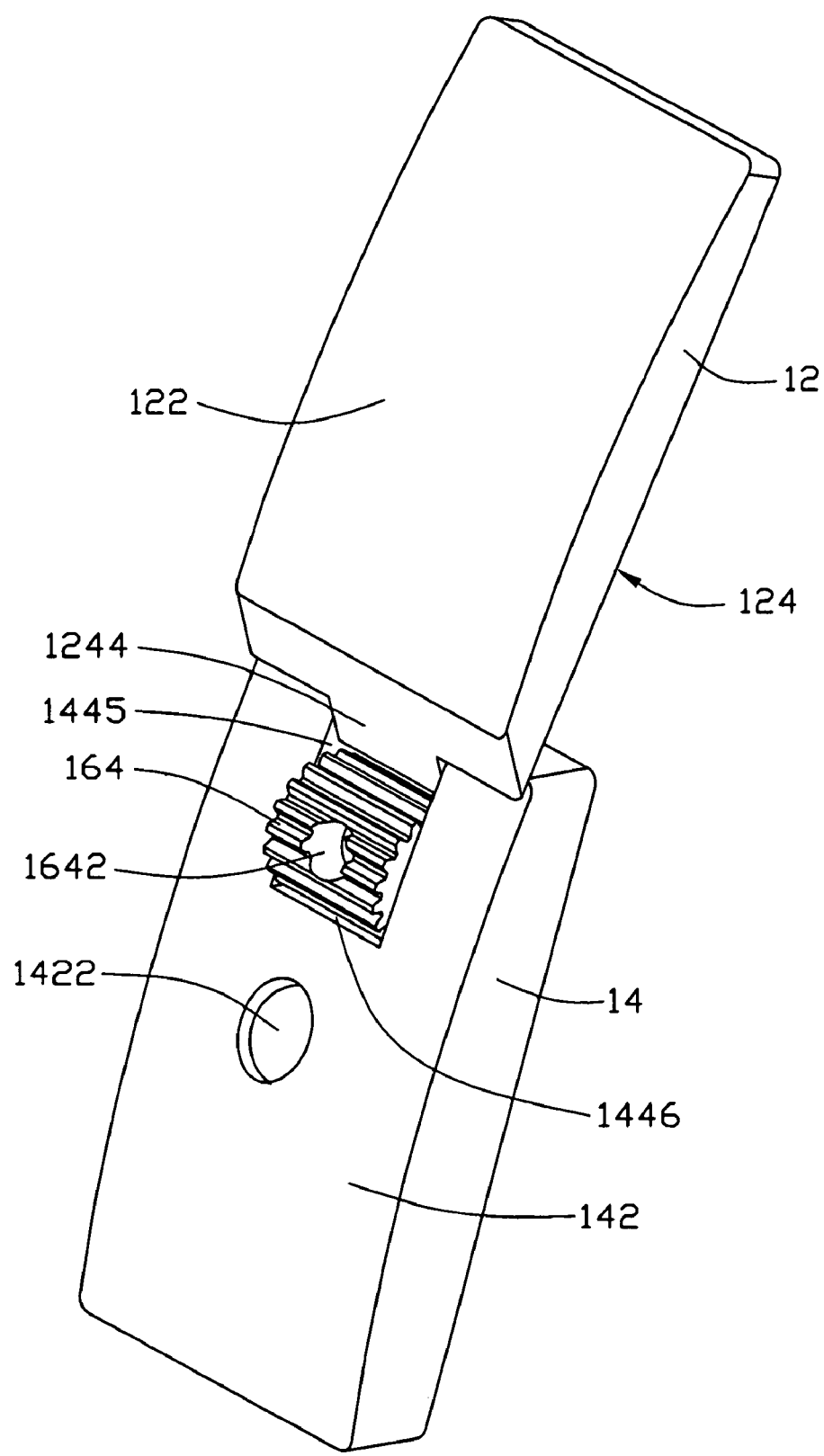
FIG. 2 is similar to the FIG. 1, but viewed from another aspect.

Referring also to FIG. 2, the main body 14 has an outer surface 142 and an inner surface 144. A plurality of keys 1442 is disposed on the inner surface 144, for inputting information to the mobile phone. A cavity 1444 corresponding to the joint portion 1244 of the cover body 12 is defined in a proximal end of the main body 14. The cavity 1444 is surrounded by two side walls 1445 and a bottom wall 1446. A reflector 1422 is disposed in the outer surface 142 of the main body 14. The reflector 1422 is adjacent to the cavity 1444, in order for a user to preview an image of himself/herself before taking a corresponding photo.

The lens module 16 comprises a driver gear 162, a driven gear 164, and a lens 1642. The lens 1642 is embedded in the driven gear 14. The driver gear 162 and the driven gear 164 are meshed with each other, and are contained in the cavity 1444 of the main body 14. A ratio of diameters of the driven gear 164 relative to the driver gear 162 is 3:2. The driver gear 162 extends from an end of the joint portion 1244 of the cover body 12, and is generally cylindrical. The driver gear 162 has a circumferential surface (not labeled) and two end surfaces (not labeled). A plurality of gear teeth 1622 is formed on the circumferential surface. The driver gear 162 is hollow, so that it can contain the hinge mechanism and signal transmission lines. A spindle (not shown) of the hinge mechanism protrudes from both end surfaces of the driver gear 162, for pivotably connecting the cover body 12 with the main body 14. The driven gear 164 is also generally cylindrical. The driven gear 164 has a circumferential wall (not labeled) and two end walls (not labeled). A plurality of gear teeth (not labeled) is formed on the circumferential wall of the driven gear 164. A shaft (not shown) protrudes from both end walls of the driven gear 164, for pivotably connecting the driven gear 164 in the cavity 1444. A pair of pivot holes (not shown) is defined in the side walls 1445 at the cavity 1444 respectively for receiving the shaft of the driven gear 164. The driven gear 164 is hollow, and a hole (not labeled) is defined in the circumferential wall of the driven gear 164. Thus the lens 1642 and a signal transmission line can be contained in the driven gear 164, with the lens 1642 being received in the hole. The lens 1642 is exposed to the external environment at the outer surface 142 of the main body 14, for taking photos.

The driven gear 164 is contained in the cavity 1444 of the main body 14 adjacent to the bottom wall 1446. The shaft of the driven gear 164 is received in the pivot holes, thereby pivotably connecting the driven gear 164 to the main body 14 in the cavity 1444. The driver gear 162 is also contained in the cavity 1444 of the main body 14, and the spindle of the hinge mechanism is pivotably received in the side walls 1445 at the cavity 1444. Thus the cover body 12 is pivotably connected to the main body 14, and the driver gear 162 meshes with the driven gear 164.

Figure 4:
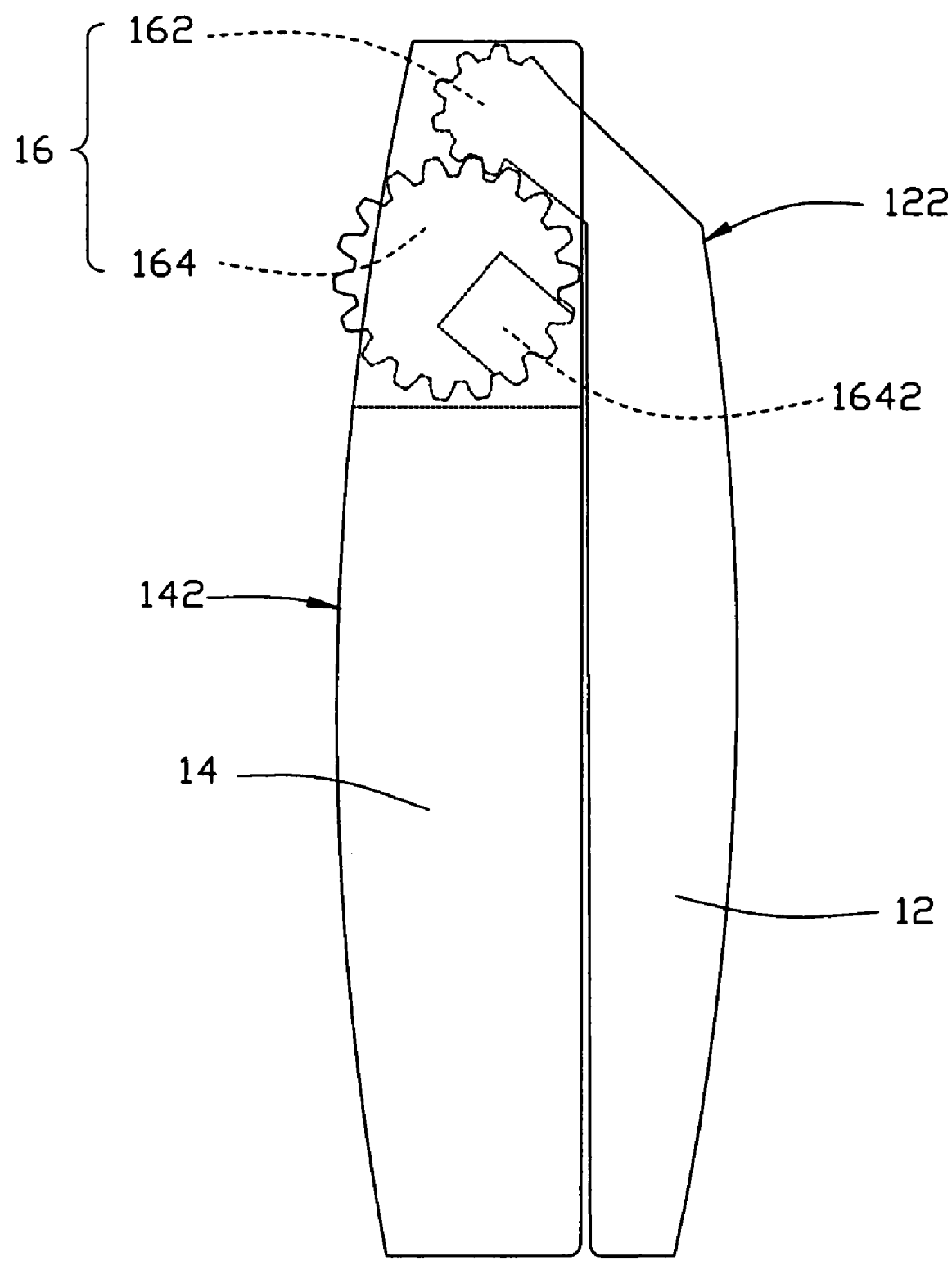
FIG. 4 is similar to FIG. 3, but showing the mobile phone in a closed position.
Figure 5:
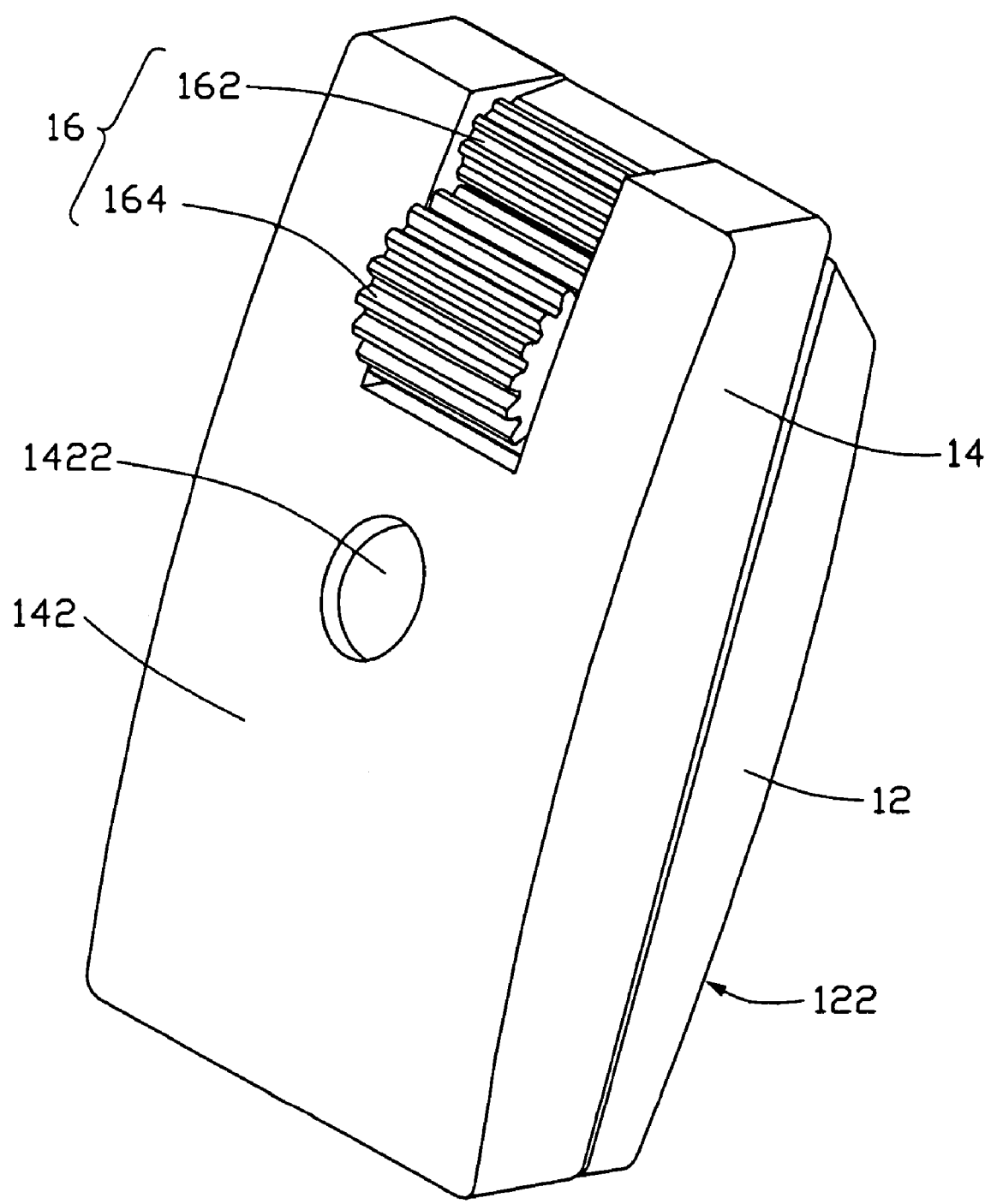
FIG. 5 is similar to FIG. 2, but showing the mobile phone in a closed position.

Referring to FIGS. 3 and 4, when the mobile phone is in the open position, the lens 1642 in the driven gear 164 faces directly away from the outer surface 142 of the main body 14. When the mobile phone is folded toward the closed position, the driver gear 162 rotates with the cover body 12 relative to the main body 14, thereby driving the driven gear 164 to rotate in the cavity 1444. Because the ratio of diameters of the driver gear 162 relative to the driven gear 164 is 2:3, when the cover body 12 has turned about 180 degrees relative to the main body 14, the driven gear 164 has correspondingly turned about 120 degrees relative to the main body 14. That is, the mobile phone has reached the closed position, with the lens 1642 contained in the cavity 1444 of the main body 14 (see FIG. 4).

In alternative embodiments, the angle between the main body 14 and the cover body 12 in the open position may be other than about 180 degrees. Accordingly, the ratio of the diameters of the driver gear 162 relative to the driven gear 164 can be configured to have another appropriate value, such as 1:2. In addition, in alternative embodiments, the location of the lens 1642 relative to the cavity 1444 of the main body 14 when the mobile phone is in the closed position may be other than what is shown in FIG. 4 for the exemplary embodiment, as long as the lens 1642 is hidden and protected in the cavity 1444. Accordingly, the ratio of the diameters of the driver gear 162 relative to the driven gear 164 can be configured to have another appropriate value that hides and protects the lens 1642.

When the mobile phone is unfolded toward the open position, the lens 1642 rotates according to rotation of the cover body 12 relative to the main body 14. When the mobile phone has reached the open position, the lens 1642 faces directly away from the outer surface 142 of the main body 14. Thus the lens 1642 is ready for taking a photo. The photo can be previewed via the LCD 1242 if an object is to be photographed, or previewed via the reflector 1422 if the user is to photograph himself/herself.

It will be apparent that many changes and modifications of the several features described herein may be made without departing from the spirit and scope of the invention. It is therefore to be understood that the foregoing description is by way of illustration of the invention rather than limitation of the invention.

What is claimed is:

1. A portable electronic device with a camera, comprising:
   a main body;
   a cover body;
   a driver gear fixed relative to the cover body and having a plurality of teeth;
   a driven gear having a plurality of teeth and meshing with teeth of the driver gear;
   a lens installed in the driven gear; and
   a hinge mechanism pivotally connecting the main body with the cover body.

2. The portable electronic device with a camera as claimed in claim 1, wherein a joint portion extends from a proximal end of the cover body adjacent to the main body.

3. The portable electronic device with a camera as claimed in claim 2, wherein a cavity corresponding to the joint portion is defined in a proximal end of the main body.

4. The portable electronic device with a camera as claimed in claim 3, wherein the driver gear extends from an end of the joint portion of the cover body.

5. The portable electronic device with a camera as claimed in claim 4, wherein the driver gear is contained in the cavity of the main body, and the spindle of the hinge mechanism is pivotably received in a side wall at the cavity.

6. The portable electronic device with a camera as claimed in claim 3, wherein the driven gear pivotably connects to the main body in the cavity.

7. The portable electronic device with a camera as claimed in claim 6, wherein a shaft protrudes from opposite end walls of the driven gear.

8. The portable electronic device with a camera as claimed in claim 7, wherein the main body defines a pair of pivot holes in opposite side walls thereof at the cavity, the pivot holes pivotably receiving the shaft of the driven gear.

9. The portable electronic device with a camera as claimed in claim 3, wherein the lens is contained in the cavity of the main body, and is exposed to the external environment at an outer surface of the main body when the cover body is in an open position relative to the main body.

10. The portable electronic device with a camera as claimed in claim 3, wherein a reflector is disposed in the outer surface of the main body, and is adjacent to the cavity.

11. The portable electronic device with a camera as claimed in claim 1, wherein the driver gear is hollow.

12. The portable electronic device with a camera as claimed in claim 1, wherein the teeth of the driver gear are formed on a circumferential surface thereof.

13. The portable electronic device with a camera as claimed in claim 1, wherein the hinge mechanism is contained in the driver gear, and a spindle of the hinge mechanism protrudes from opposite end surfaces of the driver gear.

14. The portable electronic device with a camera as claimed in claim 1, wherein the driven gear is hollow, and defines a hole in a circumferential wall thereof.

15. The portable electronic device with a camera as claimed in claim 14, wherein the lens is received in the hole.

16. The portable electronic device with a camera as claimed in claim 1, wherein a ratio of a diameter of the driver gear relative to a diameter of the driven gear is approximately 2:3.

17. The portable electronic device with a camera as claimed in claim 1, wherein a liquid crystal display is provided in an inner surface of the cover body.

18. A portable electronic device with a camera, comprising:
a main body;
a cover body pivotally mounted to the main body;
a driver gear connected with the cover body;
a driven gear rotatably installed in the main body, the driven gear engaging with the driver gear; and
a lens installed in the driven gear.

19. A portable electronic device with a camera, comprising:
a main body;
a cover body pivotally mounted to the main body;
a driven unit rotatably installed in the main body and having a lens installed therein;
a driver unit fixed to the cover body and configured to drive the driven unit with the lens to rotate;
wherein the lens is moved between first and second positions corresponding to rotation of the cover body with regard to the main body.

20. The portable electronic device with a camera as claimed in claim 19, wherein the driven unit is a driven gear, and the driver unit is a driver gear.

* * * * *